UNITED STATES PATENT OFFICE.

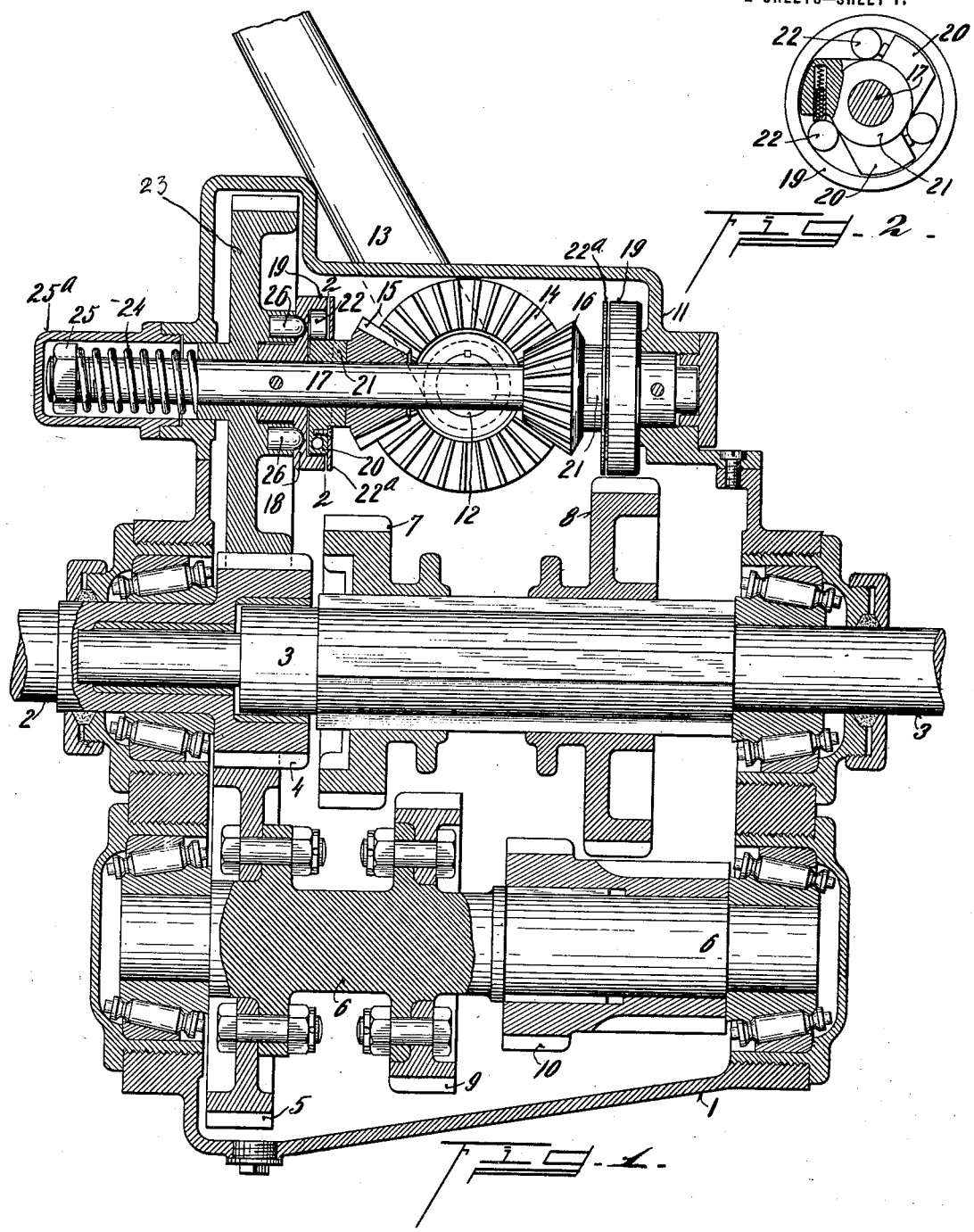

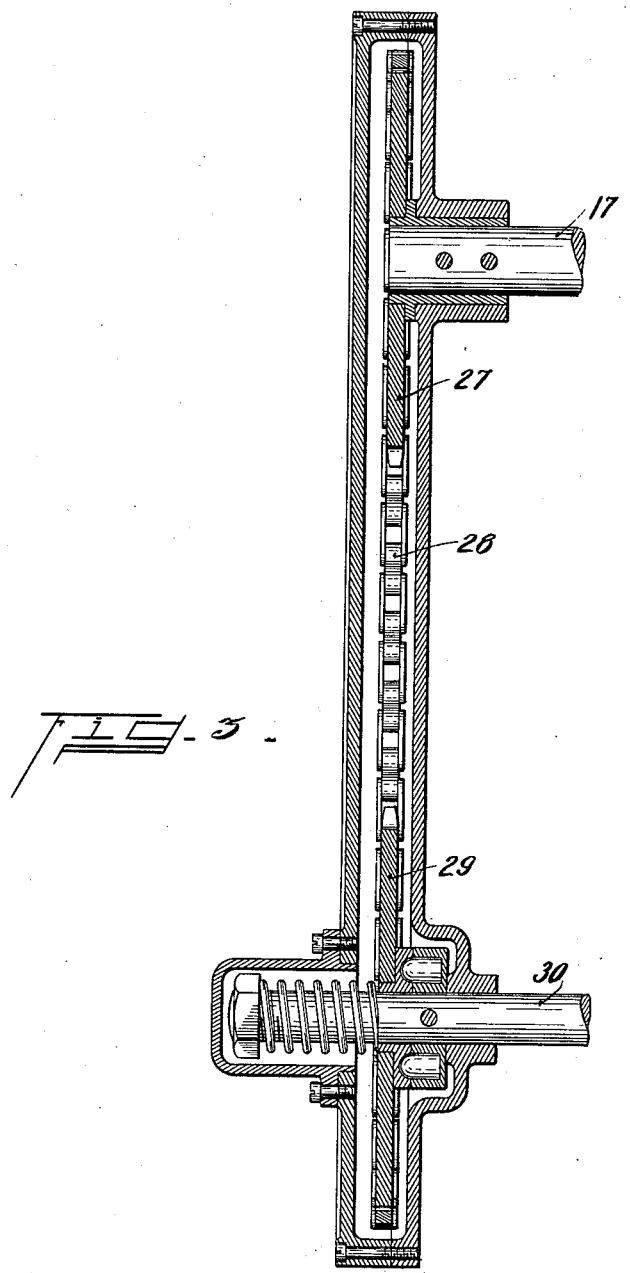

THOMAS CARROLL AND WILLIAM M. CARROLL, OF DAYTON, OHIO.

ENGINE-CRANKING MECHANISM.

1,161,841.  Specification of Letters Patent.  Patented Nov. 30, 1915.

Application filed June 29, 1914.  Serial No. 847,907.

*To all whom it may concern:*

Be it known that we, THOMAS CARROLL and WILLIAM M. CARROLL, citizens of the United States, and residing at Dayton, in the county of Montgomery and State of Ohio, have invented a new and useful Engine-Cranking Mechanism, of which the following specification is a full disclosure.

Our invention, from a generic view, relates to a mechanical movement for converting reciprocatory or oscillatory into rotary motion, non-reversible as to its direction, with its primary contemplated use comprised as a cranking device for an explosive engine.

An object of the invention is to provide a compact and simple device manually operated by a lever in an oscillating motion, and when in use in motor vehicles accessible within reach of the seat of the operator, whereby the lever motion is converted into rotary non-reversible, so that reverse influences of the engine shaft cannot be counter-imparted to the operating lever. Thus it has added advantages to its delegated use for engine cranking, in that it possesses safety qualifications insuring against injury to the operator, from reverse impulses of the engine.

Another object of our invention relates to its unitary combination with the transmission of a motor-propelled vehicle and in its ready installation into commercial vehicles.

Other objects and advantages will be readily apparent and exemplified in the description of the accompanying drawings, forming a part of this specification and disclosing a preferred embodiment of the invention, and also relate to certain details of construction fully disclosed herein, and in such drawings like characters of reference denote corresponding parts throughout the several views of which:—

Figure 1 is a central vertical section through a transmission device of a motor vehicle, with our invention as engine cranking mechanism unitarily combined therewith. Fig. 2 is a section on line 2—2, Fig. 1. Fig. 3 is a modification illustrating a means for coupling the cranking mechanism and engine shaft when remotely disposed.

In the following description, our invention is referred to as engine cranking mechanism in conformity with the drawing disclosure and its preferred contemplated use. From a generic aspect, however, it may be treated as motion converting mechanism for converting oscillatory into rotary motion. As engine cranking mechanism for a motor vehicle it offers compactness, so that it may be conveniently placed upon the dash-board of an automobile or other accessible position within the car, and within reach from the seat of the operator. In some designs of automobiles, it is possible to unitarily combine the cranking mechanism and transmission to connect with the engine shaft, securing approximately a direct connection between the cranking mechanism and shaft, without interfering with the transmission, which simplifies the construction and possesses considerable advantage in assembling. In other instances, such direct connection cannot be conveniently made, and, therefore, requires intermediate transmitting elements to establish a union between parts, with both forms herein regarded as the equivalent of each other.

Referring now to Fig. 1, illustrating the unitary combination, the cranking mechanism is supported within a casing member forming a closure for the transmission casing, which eliminates separate attention to the parts for lubrication, condenses the structure into a unit with the various rotative elements housed within a single oil chamber or reservoir. It also provides convenient means for applying the cranking mechanism to a car in use after it has left the manufactory.

The transmission as a variable speed or reversing device may be of various forms of construction from that herein disclosed, and, therefore, the specific details should not be recognized as a part of this invention to limit its scope, the form being preferred and selected as representing the design of commercial automobile to which the cranking mechanism may be applied without change by merely removing the closure cap of the transmission casing and substituting the closure casing containing the cranking mechanism. Exception to the foregoing may, however, be made in so far as it relates to the unit construction of casing for cranking mechanism and transmission, and in the direct connection with the crank shaft of the engine through an element of the transmission.

The casing 1 serves as a support and journal for the various shafts of the transmission and as a reservoir for the lubricant, with the outlets suitably sealed, so that the transmission elements may be immersed or run in a bath of a lubricant, which principle is likewise followed with the cranking mechanism, which is exposed within the casing. The shafts are journaled within suitable anti-friction bearings removably mounted in the casing, but as their construction does not concern this invention, no further reference will be made as to their specific details of construction.

The engine or crank shaft 2 journals coaxially with the driven shaft 3, with the ends of said shaft loosely, telescopically joined to maintain their alinement and stabilize them when connected for a direct drive. The extremity of the engine shaft 2 within the casing is provided with a gear 4 in mesh with a gear 5 fixed to an intermediate shaft 6 for connecting the two shafts 2 and 3 through a gear train for changing their relative speeds or reversing their direction of rotation, and, therefore, form elements of a variable speed combination, and which additionally comprises the gears 7 and 8 of different diameter splined and slidable upon the driven shaft 3. These gears 7 and 8 are shifted so as to alternately intermesh with respective different diameter gears 9 and 10 upon the intermediate shaft 6 rotating as a unit with gear 5 on said intermediate shaft. The gear 7 has its side adjacent the gear 4 recessed and interiorly screwed to laterally engage with the teeth of the gear 4 for directly coupling the shafts 2 and 3.

As the cranking mechanism is shown in connection with the gear 4, it is desirable to disconnect the driven shaft from the crank shaft, so as to relieve the operator from administering the power required for rotating such members of the transmission, which are usually in direct connection with the elements propelling the car.

The cranking mechanism is supported and journaled within a casing member 11, forming a closure for the casing 1, a rock shaft 12 is journaled in the casing 11, with one end thereof projected beyond the casing or exteriorly to which a lever 13 is fixed. The lever 13 is the prime mover for the cranking device and for cranking the engine, is manually oscillated and its motion is converted into an approximately continuous rotary motion in one direction. The result is a powerful leverage, easily and conveniently operated, requiring no manual exertion. The opposite end of the rock shaft 12, within the casing 11, is provided with a beveled gear 14 fixed thereto and in constant intermesh with right and left bevel gears 15 and 16 diametrically disposed upon opposite sides of the axis of gear 14. These bevel gears 15 and 16 are normally loose upon their shaft 17, but capable of being independently clutched thereto alternately and coördinately with a relative stroke of the lever 13. The clutching devices for each of the gears 15 and 16 are duplicates, containing a ratchet principle to instantly perform a coupling function in one direction of rotation and releasable in a reversely free from back thrusts in their reverse action. The clutches comprise a cup-shaped annulus 18 fixed to the shaft 17, providing an annular flange 19, circumferentially surrounding the spider arms 20 of a spider member 21 fixed to a respective gear 15 or 16 and loose upon the shaft 17, the arms rotate concentrically within and are housed by the annulus 18, with each arm provided with a marginal surface tangential to the flange inner circumference to provide a tapering pocket between said tangential surface of each arm and inner flange surface to receive a roller 22 as a wedge, to bind the parts frictionally together in one direction of rotation, automatically releasing in a reverse direction or when the speed of the driven clutch member, or annulus 18, is rotated at a higher rate than the driving element. Each of said spider arms 21 opposite its tangential surface has a plunger laterally projected therefrom and yieldingly urged outwardly toward and against a roller wedge 22, to direct it toward its wedging position within the pocket. Such construction of coupling clutch is quick acting and positive in its operation for rotating the parts in one direction and releasable to reverse rotation of the driving clutch member or when the driven clutch member is excessively speeded in the determined direction to no longer require the effectiveness of the connection.

It is apparent that the clutching devices may be variously modified and may comprise various forms of construction for producing the result herein sought and contemplated, and that the specific construction shown is not included herein for limiting the scope of the invention.

The spider member 21 has a disk 22$^a$ fixed thereto, serving as a retainer, to confine the rollers within their pockets to prevent the same from being dislodged. The motion of shaft 17 is imparted to the crank shaft 2, or which may be termed a driven shaft, when the cranking mechanism serves as a prime mover, by means of a gear 23, upon shaft 17 intermeshed with the gear 4 of the transmission. The gear 23 revolves as an idler when the speed of shaft 2 exceeds that of shaft 17, or rather when the shaft 2 is converted from a driven to a driving member and will convert no motion to the bevel gears when the manually operated lever 13 is at rest, and which is due to the peculiar coupling devices above described. A reverse rotation of the shaft 2 would alter conditions, detrimental to the motion converting devices and to guard against such emergencies, which would occur during a back-firing interval of the engine, we provide means qualifying as safety devices, automatic in their operation, to relieve the motion converting or cranking devices of such reverse action. The gear 23 being loose upon the shaft 17 rotatively has a slight lateral movement thereon against the tension of a spring 24, concentrically coiled upon said shaft and interposed between said gear and a nut 25 screw threaded upon the end of shaft 17, the nut 25 being utilized to regulate the tension of the spring to increase or decrease the coupling tension between the gear 23 and its shaft. The hub of the gear 23 having a series of laterally projected pins 26, each adapted to engage into a concave recess formed in the clutch annulus 18 to rotatively bind said parts together yieldingly under the pressure of the spring, releases under an excessive pressure to disengage the parts automatically. The pins ride upon the incline of the recesses, shifting the gear 23 laterally compressingly against the spring. The parts readily snap into position of interlock when the pins come into registry with the recesses as soon as conditions are normalized. The spring and end of shaft 17 are inclosed within a cap-plug 25ª, screw threaded into the bearing hub of the cap casing member 11. It is obvious that the device is equally operative through a continuous rotation of the lever 13 instead of relying upon oscillatory motion, in which instance but one of the beveled gears 15 or 16 could be dispensed with or a crank handle substituted for the lever, but this does not offer the leverage, within the easy command of the operator as that of the oscillating lever, and also requires more clearance space within the automobile nor can it be as conveniently located within reach of it from the seat of the operator.

Referring now to Fig. 3 of the drawings, we have shown the shaft 17 of the cranking mechanism as provided with a sprocket wheel 27 engaged with a sprocket chain 28, which loops over a sprocket wheel 29 upon the shaft 30 distantly located from the shaft 17 and wherein the chain is the equivalent of the direct gear connection, shown in Fig. 2. This modification shows the safety appliances as located upon the driven shaft instead of upon shaft 17, with no change in their construction, to disqualify the cranking mechanism after the engine has been started and its shaft is converted into a driving shaft to relieve the cranking mechanism of undue wear from idle motion when its use is not required. It is obvious, however, that the relative disposition of the various devices is optional, and not confined to the location, as herein disclosed.

The clutching devices possess a ratchet principle of operation, rotatively quickly clamping and releasing with the alternate rotations of the bevel gears, and, therefore, do not impede the forward or normal rotation of shaft 17, nor develop any resisting pressure upon the lever. Should the shaft 17, however, be subjected to counter-influences or rotation, as transposing the driven elements into driving, both clutches would function to intercept any rotative tendency of the shaft 17, and, therefore, serve as locking means. This prevents imparting back firing impulses of the engine to the lever 13, which remains motionless, so as not to wrought injury to the operator. Therefore, the shaft 17 may be defined as a non-reversible driven shaft, with the releasable feature of gear 18 protecting the parts against injury under such abnormal conditions.

Having now described our invention, we claim:—

1. In a device of the nature disclosed, combining an oscillating driving shaft and a rotative driven shaft jouraled at right angles to each other, gears connecting said shafts, comprising a beveled gear fixed upon the driving shaft and right and left beveled gears on the driven shaft intermeshed with said first-named gear, and ratchet functioning clutch devices for alternately connecting said right and left gears to their shaft in relative oscillatory movements of said driving shaft, and a gear loose on said driven shaft yieldingly connecting with one of said clutch devices.

2. A device of the nature disclosed, combining an oscillating member, a non-reversible driven member, opposing intermediate motion transmitting members coöperating with said oscillating member, and friction clutch devices for said opposing members for respectively alternately coupling the same to said driven member in relative coordinate oscillating strokes of said first-named member, to rotate said driven member in a determined direction and restraining it from converse direction, and transmission means connecting with said driven member automatically releasable therefrom under converse transmitting influences.

3. In a device of the nature disclosed, an oscillating driving member, a non-reversible driven member, conversely rotatable members coöperating with said driving member, ratchet functioning clutching devices for each of said rotatable members to alternately connect with said driven member to rotate said driven member in a determined direction and restraining it from reverse direction, and transmission means connecting with said driven member releasable therefrom under converse transmitting influences.

4. A device of the nature disclosed combining an oscillating driving shaft, a second shaft, separate oppositely disposed clutch mechanisms for said second shaft, means on said first shaft for giving motion simultaneously to both said clutch mechanisms for rendering them alternately effective to non-reversibly rotate said second shaft, and a motion transmitting member normally connecting with said second shaft releasable therefrom under reverse rotative influence thereof.

5. In a device of the nature disclosed, an oscillating lever operated driving member, a positively directioned driven member, concurrently conversely rotatable members coöperating with said driving member, ratchet functioning clutching devices to concurrently alternately connect and disconnect said rotatable members to and from said driven member in respective coördinate lever motions of said driving member and a transmission member coaxial with said driven member rotating therewith within determined degrees of transmitting power.

6. In a device of the nature disclosed, a non-reversible driven shaft, lever actuated motion converting devices for rotating said shaft in a determined direction and to lock the same under reverse influences, a gear on said shaft normally yieldingly coupled thereto and releasable reversely.

7. In a device of the nature disclosed, a definitely directioned rotating shaft, lever actuated motion converting devices for rotating said shaft in its definite direction and lock the same under reverse influences, a motion transmitting member coupled thereto and releasable therefrom at a higher speeded coincidentally directioned rotation to said shaft and under reverse influences.

8. In a transmission device, a power driven shaft susceptible to rotation in alternate directions, manually operated auxiliary devices for rotating said shaft in a determined direction and restraining converse influences transmitted from said shaft, comprising a lever operated oscillating shaft, a second shaft, oppositely disposed clutch mechanisms for said second shaft, means for said second shaft giving motion simultaneously to both said clutch mechanisms for rendering them alternately effective to rotate said second shaft in a determined direction, and transmission means connecting said power driven shaft and second shaft in one direction of motion.

9. In a transmission device, a power driven shaft susceptible to rotation in alternate directions, a second shaft, manually reciprocating lever motion converting devices for rotating said second shaft in a determined direction and restraining converse influences for rotating said power driven shaft and transmission means interveningly connecting said power shaft and second shaft non-reciprocal as to converse direction of rotation.

10. In a device of the nature disclosed, a power driven shaft, a gear connecting with said shaft, manually operated motion imparting devices having a gear as an element thereof releasable therefrom as a transmitter under abnormal or counter influences engaged with said first-named gear for manually rotating said shaft.

11. In a device of the nature disclosed, a casing for inclosing and supporting transmission devices, a motor driven shaft extended into said casing, a gear on said shaft, a casing member as a closure for said casing, and manually operated motion imparting devices supported in said casing member, and in transmitting train with said shaft gear.

12. In a device of the nature disclosed, a casing for inclosing and supporting transmission devices, a motor driven shaft extended into said casing, a gear on said shaft, a casing member as a closure for said casing, and manually lever-operated motion converting devices supported within said casing member in transmitting connection with said gear, transmittingly non-influenced by reverse or counter-motion from said shaft.

13. In a device of the nature disclosed, a transmission inclosing casing, a shaft extended into said casing, a casing member as a closure for said casing, manually operated motion converting devices supported within said casing member for rotating said shaft in a normal direction, and intercepting counter-rotation from said shaft, a train of gears interveningly connecting said shaft and motion converting devices, and means for releasing one of said gears when subjected to abnormal motion influences.

14. In a device of the nature disclosed, a shaft susceptible to rotation in alternate directions, and manually operated non-reversible motion imparting devices connecting with said shaft to rotate said shaft in a determined direction and automatically disconnecting therefrom with accelerated or converse shaft motion.

15. In a device of the nature disclosed, a motor driven shaft, a gear on said shaft, and manually lever-operated motion converting devices in transmitting connection with said gear, transmittingly non-influenced by reverse or counter-motion from said shaft, and means intervening said gear and motion converting devices automatically disconnecting said shaft and motion converting devices with converse shaft motion.

16. In a device of the nature disclosed, a shaft, manually operated motion converting devices for rotating said shaft in a normal direction, and intercepting counter-rotation from said shaft, transmission devices including a gear interveningly connecting said shaft and motion converting devices, and means for releasing said gear when subjected to abnormal motion influences.

In witness whereof, we hereunto subscribe our names, as attested by the two subscribing witnesses.

THOMAS CARROLL.
WILLIAM M. CARROLL.

Witnesses:
H. P. WILLIAMSON,
V. A. TROXELL.